(12) United States Patent
Takahashi et al.

(10) Patent No.: US 8,280,597 B2
(45) Date of Patent: Oct. 2, 2012

(54) CONTROL APPARATUS OF AUTOMATIC TRANSMISSION

(75) Inventors: Seiichiro Takahashi, Isehara (JP); Tatsuo Ochiai, Kanagawa (JP); Masaaki Uchida, Yokosuka (JP); Masato Koga, Hiratsuka (JP); Ryoji Kadono, Kawasaki (JP); Tateki Jozaki, Yokohama (JP); Hideaki Suzuki, Yokohama (JP); Ryousuke Nonomura, Kawasaki (JP); Mamiko Inoue, Machida (JP)

(73) Assignees: Nissan Motor Co., Ltd., Yokohama-shi (JP); JATCO Ltd, Fuji-shi (JP)

( * ) Notice: Subject to any disclaimer, the term of this patent is extended or adjusted under 35 U.S.C. 154(b) by 131 days.

(21) Appl. No.: 12/712,440

(22) Filed: Feb. 25, 2010

(65) Prior Publication Data
US 2010/0228450 A1    Sep. 9, 2010

(30) Foreign Application Priority Data

Mar. 6, 2009   (JP) ................................. 2009-054035

(51) Int. Cl.
G06F 7/00     (2006.01)
G06F 17/00    (2006.01)
G06F 19/00    (2006.01)
(52) U.S. Cl. ......................................................... 701/51
(58) Field of Classification Search ............... 701/51, 701/55, 58, 60, 61, 67, 87; 477/908; 475/207, 475/208, 210
See application file for complete search history.

(56) References Cited

U.S. PATENT DOCUMENTS

| | | | |
|---|---|---|---|
| 4,653,351 A | | 3/1987 | Downs et al. |
| 4,672,863 A | * | 6/1987 | Itoh et al. ........................ 477/41 |
| 6,377,882 B1 | * | 4/2002 | Ito ................................... 701/51 |
| 6,855,085 B1 | | 2/2005 | Gumpoltsberger |
| 7,771,316 B2 | * | 8/2010 | Honma et al. ................ 477/130 |
| 2006/0154780 A1 | | 7/2006 | Ayabe et al. |
| 2007/0093358 A1 | | 4/2007 | Ayabe et al. |

FOREIGN PATENT DOCUMENTS

| | | |
|---|---|---|
| EP | 0 410 451 A2 | 1/1991 |
| EP | 806 592 A2 | 11/1997 |

(Continued)

OTHER PUBLICATIONS

U.S. Appl. No. 12/712,429, filed Feb. 25, 2010, Takahashi et al.

(Continued)

*Primary Examiner* — Mary Cheung
*Assistant Examiner* — Kyle K Tsui
(74) *Attorney, Agent, or Firm* — Foley & Lardner LLP

(57) ABSTRACT

A control apparatus of an automatic transmission has an engagement part, a power-ON/OFF state judgment section and a control section controlling a capacity of the engagement part. The control section compares an actual input revolution speed difference absolute value of an absolute value of a difference between an input revolution speed when engaged and an actual input revolution speed with a target input revolution speed difference absolute value of an absolute value of a difference between the input revolution speed when engaged and a target input revolution speed, then a deviation is determined by subtracting the target input revolution speed difference absolute value from the actual input revolution speed difference absolute value. When the deviation is positive, the capacity is increased. When the deviation is negative, the capacity is reduced. When the deviation is zero, a previous capacity that is set before the comparison of the both absolute values is maintained.

6 Claims, 12 Drawing Sheets

FOREIGN PATENT DOCUMENTS

| | | |
|---|---|---|
| EP | 0 959 270 A2 | 11/1999 |
| JP | 61-105361 A | 5/1986 |
| JP | 5-079554 A | 3/1993 |
| JP | 5-240335 A | 9/1993 |
| JP | 6-129528 A | 5/1994 |
| JP | 8-285064 A | 11/1996 |
| JP | 8-291858 A | 11/1996 |
| JP | 10-331962 A | 12/1998 |
| JP | 10-331963 A | 12/1998 |
| JP | 11-37267 A | 2/1999 |
| JP | 11-141675 A | 5/1999 |
| JP | 11-182663 A | 7/1999 |
| JP | 2000-205398 A | 7/2000 |
| JP | 2003-42284 A | 2/2003 |
| JP | 2003-314681 A | 11/2003 |
| JP | 2004-316811 A | 11/2004 |
| JP | 2006-348985 A | 12/2006 |
| JP | 2007-92665 A | 4/2007 |
| JP | 2007-225048 A | 9/2007 |
| JP | 2007-263206 A | 10/2007 |

OTHER PUBLICATIONS

U.S. Appl. No. 12/712,437, filed Feb. 25, 2010, Takahashi et al.
U.S. Appl. No. 12/712,448, filed Feb. 25, 2010, Takahashi et al.
U.S. Appl. No. 12/712,454, filed Feb. 25, 2010, Takahashi et al.
S. Takahashi et al., US Non-Final Office Action, U.S. Appl. No. 12/712,448, dated Jul. 24, 2012, (92 pgs.).

* cited by examiner

[IN NON-SHIFT STATE, IN PRELIMINARY PHASE FOR SHIFT]

[IN SHIFTING STATE (TORQUE PHASE, INERTIA PHASE)]

CONTROL APPARATUS OF AUTOMATIC TRANSMISSION

BACKGROUND OF THE INVENTION

The present invention relates to a control apparatus of an automatic transmission, which controls engagement/disengagement of an engagement part and is capable of maintaining an input revolution speed of the engagement part at an appropriate revolution speed that depends on power-ON/OFF states, to achieve a target input revolution speed of the engagement part at least according to the power-ON/OFF states.

As a control apparatus of the automatic transmission, for example, a Japanese Patent Provisional Publication No. 2007-225048 (hereinafter is referred to as "JP2007-225048") discloses a control apparatus of the automatic transmission. In JP2007-225048, a difference between an input revolution speed when engaged and an actual input revolution speed of an engagement part of a lock-up clutch and a difference between the input revolution speed when engaged and a target input revolution speed of the same engagement part, are compared. Then, by changing a capacity (an engagement fluid pressure or a disengagement fluid pressure) of the engagement part in accordance with a magnitude relationship between these differences, the clutch is slip-engaged while maintaining the input revolution speed of the target.

SUMMARY OF THE INVENTION

In such control apparatus of the automatic transmission, however, in a case where the power-ON/OFF state is misjudged, for instance, in a case where the power state is judged to be the power-OFF state, but actually the power state is the power-ON state, even if the input revolution speed of the engagement part of the lock-up clutch is changed in a direction moving away from the target input revolution speed due to the misjudgment, this change cannot be suppressed.

Therefore, in the present invention, in order to achieve the target input revolution speed of the engagement part at least according to the power-ON/OFF states, when controlling the engagement/disengagement of the engagement part by increasing/decreasing or maintaining the capacity of the engagement part, an absolute value of the difference between the input revolution speed when engaged and the actual input revolution speed of the engagement part and an absolute value of the difference between the input revolution speed when engaged and the target input revolution speed of the same engagement part are compared, then the increase/decrease/maintenance of the capacity are controlled on the basis of this comparison result.

According to one aspect of the present invention, a control apparatus of an automatic transmission comprises: an engagement part which is engaged by increasing a capacity of the engagement part and is disengaged by reducing the capacity of the engagement part; a power-ON/OFF state judgment section which judges power-ON/OFF states; and a control section which controls the capacity of the engagement part so as to calculate and achieve a target input revolution speed of the engagement part at least according to the power-ON/OFF states, and the control section is configured (a) to compare an actual input revolution speed difference absolute value that is defined as an absolute value of a difference between an input revolution speed of the engagement part when engaged and an actual input revolution speed of the engagement part with a target input revolution speed difference absolute value that is defined as an absolute value of a difference between the input revolution speed of the engagement part when engaged and the target input revolution speed of the engagement part; and (b) to increase the capacity of the engagement part when the actual input revolution speed difference absolute value is greater than the target input revolution speed difference absolute value; (c) to reduce the capacity of the engagement part when the actual input revolution speed difference absolute value is less than the target input revolution speed difference absolute value; and (d) to maintain a previous capacity of the engagement part which is set before the comparison of the both actual input and target input revolution speed difference absolute values when the actual input revolution speed difference absolute value is equal to the target input revolution speed difference absolute value.

According to another aspect of the present invention, a control apparatus of an automatic transmission comprises: an engagement part which is engaged by increasing a capacity of the engagement part and is disengaged by reducing the capacity of the engagement part; judging means for judging power-ON/OFF states; and controlling means for controlling the capacity of the engagement part so as to calculate and achieve a target input revolution speed of the engagement part at least according to the power-ON/OFF states, and the controlling means is configured (a) to compare an actual input revolution speed difference absolute value that is defined as an absolute value of a difference between an input revolution speed of the engagement part when engaged and an actual input revolution speed of the engagement part with a target input revolution speed difference absolute value that is defined as an absolute value of a difference between the input revolution speed of the engagement part when engaged and the target input revolution speed of the engagement part; and (b) to increase the capacity of the engagement part when the actual input revolution speed difference absolute value is greater than the target input revolution speed difference absolute value; (c) to reduce the capacity of the engagement part when the actual input revolution speed difference absolute value is less than the target input revolution speed difference absolute value; and (d) to maintain a previous capacity of the engagement part that is set before the comparison of the both actual input and target input revolution speed difference absolute values when the actual input revolution speed difference absolute value is equal to the target input revolution speed difference absolute value.

According to a further aspect of the invention, a method for controlling an automatic transmission mechanism having an engagement part which is engaged by increasing a capacity of the engagement part and is disengaged by reducing the capacity of the engagement part, the method comprises: judging power-ON/OFF states; controlling the capacity of the engagement part so as to calculate and achieve a target input revolution speed of the engagement part at least according to the power-ON/OFF states; comparing an actual input revolution speed difference absolute value that is defined as an absolute value of a difference between an input revolution speed of the engagement part when engaged and an actual input revolution speed of the engagement part with a target input revolution speed difference absolute value that is defined as an absolute value of a difference between the input revolution speed of the engagement part when engaged and the target input revolution speed of the engagement part; increasing the capacity of the engagement part when the actual input revolution speed difference absolute value is greater than the target input revolution speed difference absolute value; reducing the capacity of the engagement part when the actual input revolution speed difference absolute value is less than the target input revolution speed difference absolute value; and maintaining a previous capacity of the engagement part that is set before the comparison of the both actual input and target input revolution speed difference absolute values when the actual input revolution speed difference absolute value is equal to the target input revolution speed difference absolute value.

In the present invention, even in a case where a surge or a decrease of the input revolution speed of the engagement part occurs due to the input revolution speed change in the direction moving away from the target input revolution speed by the misjudgment of the power-ON/OFF states, such surge and such decrease can be suppressed.

The other objects and features of this invention will become understood from the following description with reference to the accompanying drawings.

DETAILED DESCRIPTION OF THE INVENTION

Embodiments of the present invention will be explained below with reference to the drawings.

Figure 1:
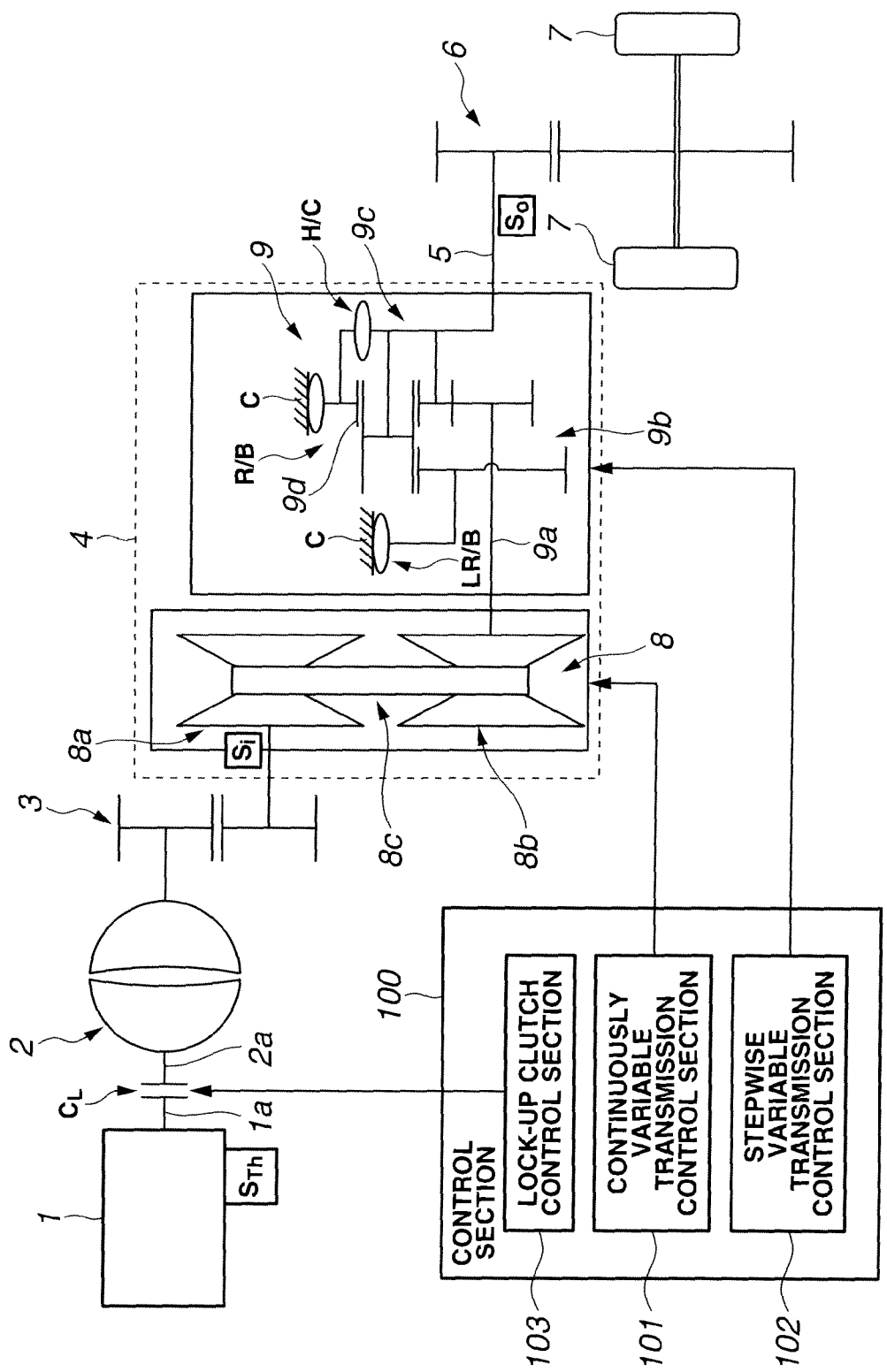
FIG. 1 is a schematic system diagram of a power train in which a control apparatus of an automatic transmission of the present invention is employed.

As shown in FIG. 1, a power train has an engine 1 of a drive source, a torque converter 2 that is connected to and driven by the engine 1, an automatic transmission mechanism 4 that is connected to and driven by the torque converter 2 through a deceleration mechanism (a reduction gear mechanism or a speed reducer) 3, a final drive gear mechanism 6 that is connected to and driven by the automatic transmission mechanism 4 through a transmission output shaft (a propeller shaft) 5 of the automatic transmission mechanism 4, and wheels 7 to which power from the automatic transmission mechanism 4 is outputted through the final drive gear mechanism 6.

Between the engine 1 and the torque converter 2, a lock-up clutch $C_L$ is provided for connecting the engine 1 and the torque converter 2. The lock-up clutch $C_L$ is supplied with oil (fluid), then engagement/disengagement of the lock-up clutch $C_L$ can be controlled according to its fluid pressure. More specifically, an input side (an engine output shaft) $1a$ of the lock-up clutch $C_L$ and an output side (a pump impeller of the torque converter 2) $2a$ of the lock-up clutch $C_L$ can be engaged/disengaged by controlling a supply pressure (capacity) of the lock-up clutch $C_L$.

The automatic transmission mechanism 4 has a continuously variable transmission mechanism (CVT mechanism) 8 and an auxiliary transmission mechanism 9.

The CVT mechanism 8 is an existing belt type (or belt-drive) continuously variable transmission mechanism, and has a drive side pulley $8a$ connected with an output shaft of the deceleration mechanism 3, a driven side pulley $8b$ connected with an input shaft $9a$ of the auxiliary transmission mechanism 9 and a belt $8c$ wound around these pulleys $8a$, $8b$.

Each of the drive and driven side pulleys $8a$, $8b$ is supplied with oil (fluid), and a pulley width can be varied freely in accordance with its fluid pressure. With this fluid pressure control, i.e. by controlling the supply pressure for each of the drive and driven side pulleys $8a$, $8b$, a transmission ratio of the CVT mechanism 8 can be continuously changed (namely that a stepless transmission ratio of the CVT mechanism 8 can be controlled).

On the other hand, as for the auxiliary transmission mechanism 9, it is a geared transmission mechanism (a stepwise variable transmission mechanism or a multi-speed transmission mechanism) that has a ravigneaux planetary gear mechanism. As can be seen in FIG. 1, a combined sun gear $9b$ of the ravigneaux planetary gear mechanism is connected to and driven by the driven side pulley $8b$ as an input of the ravigneaux planetary gear mechanism through the input shaft $9a$, while a carrier $9c$ is connected with the transmission output shaft 5 and acts as an output of the ravigneaux planetary gear mechanism. The sun gear $9b$ is fixed to a case C through a low-and-reverse brake (a $1^{st}$ speed selection brake) LR/B. The carrier $9c$ meshes with and is driven by a ring gear $9d$ through a high clutch (a $2^{nd}$ speed selection clutch) H/C. Further, the ring gear $9d$ is fixed to the case C through a reverse brake R/B.

The low-and-reverse brake (hereinafter called a low brake) LR/B, the high clutch H/C and the reverse brake R/B are also supplied with oil (fluid), and their engagement/disengagement can be controlled according to the respective fluid pressures. With this fluid pressure control, i.e. by controlling the supply pressure for each of these low brake LR/B, high clutch H/C and reverse brake R/B, the forward $1^{st}$ speed, the forward $2^{nd}$ speed and a reverse of the auxiliary transmission mechanism 9 can be selected.

When selecting the forward $1^{st}$ speed, the low brake LR/B is engaged and also the high clutch H/C is disengaged (released). When selecting the forward $2^{nd}$ speed, the low brake LR/B is disengaged and also the high clutch H/C is engaged. A relationship of the engagement/disengagement of each brake and clutch LR/B, H/C, R/B when controlling the auxiliary transmission mechanism 9 is shown in a following table 1.

TABLE 1

|  | LR/B | H/C | R/B |
|---|---|---|---|
| 1st speed | ○ | X | X |
| 2nd speed | X | ○ | X |
| reverse | ○ | X | ○ |

As seen in FIG. 1, the control apparatus of the automatic transmission has a shift control section 100 that performs a shift control of the automatic transmission mechanism 4. The shift control section 100 has a continuously variable transmission control section 101, a geared transmission control section (stepwise variable transmission control section or multi-speed transmission control section) 102 and a lock-up clutch control section 103. The continuously variable transmission control section 101 calculates a target input revolution speed $N_i(0)$ of the automatic transmission mechanism 4 and controls the stepless transmission ratio (hereinafter called a continuously variable transmission side ratio) $Ra_{(CVT)}$ of the CVT mechanism 8 on the basis of the target input revolution speed $N_i(0)$. The geared transmission control section 102 calculates a target shift position (or a target shift speed) of the auxiliary transmission mechanism 9 and controls the auxiliary transmission mechanism 9 to be this target shift position. The lock-up clutch control section 103 slip-controls the engagement/disengagement of the lock-up clutch $C_L$ in accordance with a vehicle travelling (or operating) condition.

By performing a cooperative shift control between the shift control of the CVT mechanism 8 and the shift control of the auxiliary transmission mechanism 9, a target transmission ratio $I_O$ of the automatic transmission mechanism 4 as a whole is realized.

Figure 2:
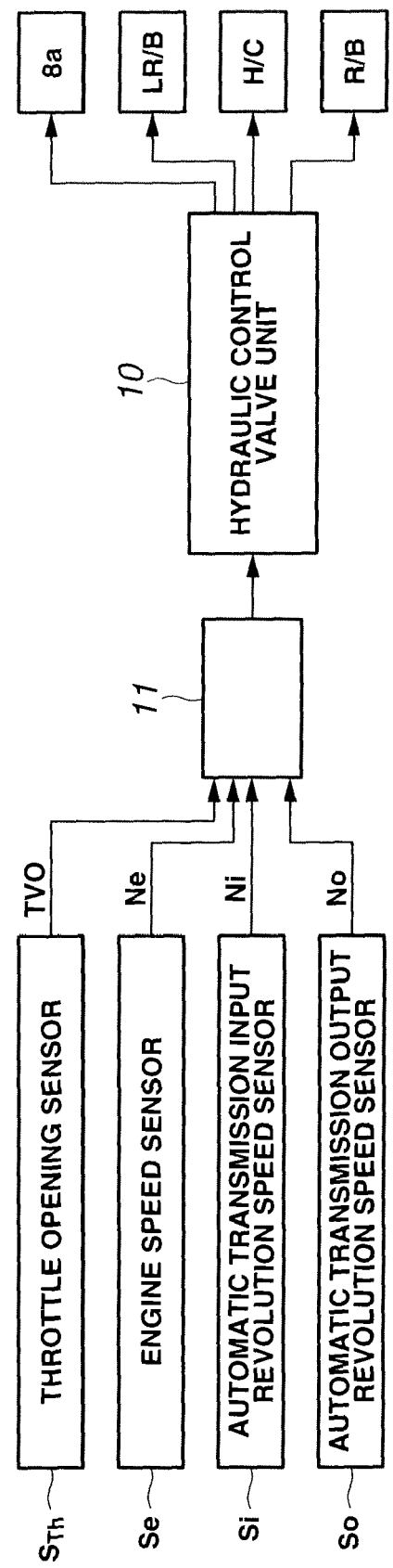
FIG. 2 is a system block diagram showing a shift control system of the power train.

As shown in FIG. 2, by executing an ON/OFF control of a plurality of solenoid valves which are provided in a hydraulic control valve unit 10, the supply pressure for each of the drive and driven side pulleys 8a, 8b in the CVT mechanism 8 (normally, only the supply pressure of the drive side pulley 8a) is controlled. With this control, the transmission ratio of the CVT mechanism 8 can be continuously changed (namely that the stepless transmission ratio of the CVT mechanism 8 can be controlled).

Likewise, by executing the ON/OFF control of the plurality of solenoid valves provided in the hydraulic control valve unit 10, each supply pressure of the low brake LR/B, the high clutch H/C and the reverse brake R/B is controlled, then the forward $1^{st}$ speed, the forward $2^{nd}$ speed or the reverse of the auxiliary transmission mechanism 9 is selected.

The hydraulic control valve unit 10 is controlled by a transmission controller 11, as shown in FIG. 2. The transmission controller 11 inputs input signals such as a signal from a throttle opening sensor $S_{Th}$ that detects a throttle opening TVO, a signal from an engine revolution speed sensor (engine speed sensor or engine rpm sensor) $S_e$ that detects an output revolution speed (hereinafter, an engine revolution speed) $N_e$ of the engine 1, a signal from an automatic transmission input revolution speed sensor $S_i$ that detects an input revolution speed (hereinafter, an automatic transmission input revolution speed) $N_i$ of the automatic transmission mechanism 4, and a signal from an automatic transmission output revolution speed sensor $S_o$ that detects a revolution speed (hereinafter, an automatic transmission output shaft revolution speed) $N_o$ of the transmission output shaft 5.

Figure 3:
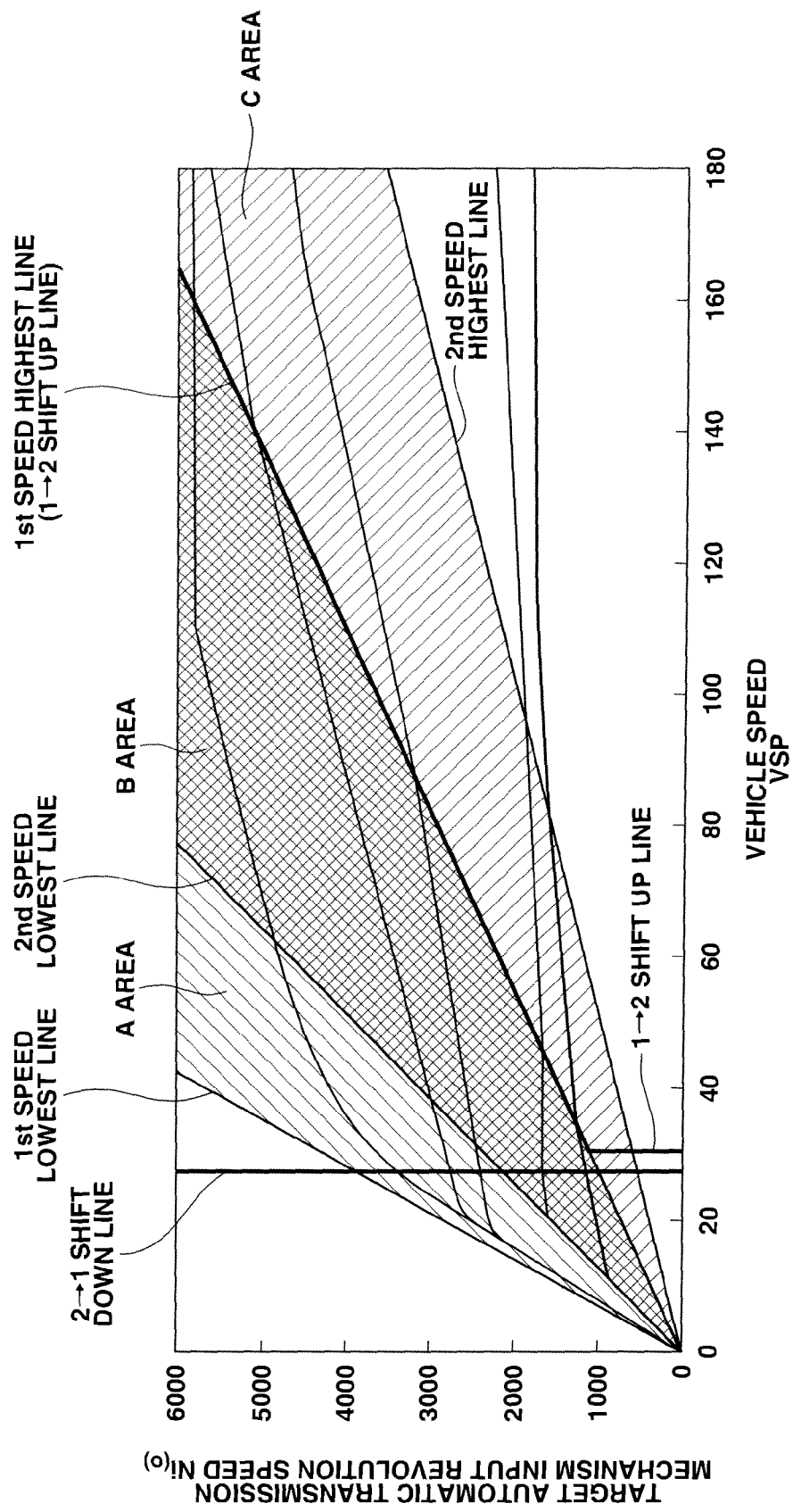
FIG. 3 is a shift line diagram (shift map) showing shift lines, used when performing a shift control of an automatic transmission mechanism.

The transmission controller 11 performs the shift control of the automatic transmission mechanism 4 as follows, on the basis of these input information using a shift line diagram (shift map) shown as an example of the shift map in FIG. 3. The shift map in FIG. 3 is a map where shift lines of the CVT mechanism 8 and shift lines of the auxiliary transmission mechanism 9 are combined. In a case where the forward $1^{st}$ speed is selected as the shift position of the auxiliary transmission mechanism 9, a shiftable area of the CVT mechanism 8 is an area from a $1^{st}$ speed lowest line to a $1^{st}$ speed highest line. In a case where the forward $2^{nd}$ speed is selected as the shift position of the auxiliary transmission mechanism 9, the shiftable area of the CVT mechanism 8 is an area from a $2^{nd}$ speed lowest line to a $2^{nd}$ speed highest line.

From this setting, an area A in FIG. 3 is an area where the shift control is possible only when the shift position of the auxiliary transmission mechanism 9 is the forward $1^{st}$ speed. An area B is an area where the shift control is possible not only when the shift position of the auxiliary transmission mechanism 9 is the forward $1^{st}$ speed, but when the shift position of the auxiliary transmission mechanism 9 is the forward $2^{nd}$ speed as well. Further, an area C is an area where the shift control is possible only when the shift position of the auxiliary transmission mechanism 9 is the forward $2^{nd}$ speed.

In the same way as the conventional method, in the areas A~C, the target automatic transmission mechanism input revolution speed $N_i(0)$ is determined in accordance with a vehicle speed VSP and the throttle opening TVO, then the CVT mechanism 8 is controlled on the basis of FIG. 3 so as to achieve this target automatic transmission mechanism input revolution speed $N_i(0)$. With this, the CVT mechanism 8 can control the stepless transmission ratio continuously. In the present embodiment, the hydraulic control valve unit 10 and the transmission controller 11 correspond to the continuously variable transmission control section 101.

On the other hand, as for the shift line of the auxiliary transmission mechanism 9, a forward $1^{st}$ speed area and a forward $2^{nd}$ speed area are determined or defined by a 1→2 shift up line by which the speed position changes from the forward $1^{st}$ speed to the forward $2^{nd}$ speed and a 2→1 shift down line by which the speed position changes from the forward $2^{nd}$ speed to the forward $1^{st}$ speed.

For example, when a travelling condition determined according to the vehicle speed VSP and the throttle opening TVO is a travelling condition in which an operating point crosses the 1→2 shift up line from a low vehicle speed side toward a high vehicle speed side, in order to select the forward $2^{nd}$ speed as the shift position of the auxiliary transmission mechanism 9, the low brake LR/B is disengaged and the high clutch H/C is engaged.

In contrast, when the travelling condition determined according to the vehicle speed VSP and the throttle opening TVO is a travelling condition in which the operating point crosses the 2→4 shift down line from the high vehicle speed side toward the low vehicle speed side, in order to select the forward $1^{st}$ speed as the shift position of the auxiliary transmission mechanism 9, the high clutch H/C is disengaged and the low brake LR/B is engaged. In the present embodiment, the hydraulic control valve unit 10 and the transmission controller 11 correspond to the geared transmission control section 102 as well.

Accordingly, by using the shift map of FIG. 3, when calculating the vehicle speed VSP and the throttle opening TVO, the forward $1^{st}$ speed or the forward $2^{nd}$ speed according to the vehicle speed VSP and the throttle opening TVO is selected in the auxiliary transmission mechanism 9. At the same time, also in the CVT mechanism 8, the shift control of the stepless transmission ratio (the shift control of the continuously variable transmission) according to the vehicle speed VSP and the throttle opening TVO is carried out.

In addition, in the automatic transmission mechanism 4, the continuous shift of the CVT mechanism 8 is carried out simultaneously with a changeover shift of the auxiliary transmission mechanism 9, then the shift control of the CVT mechanism 8 cooperates with the shift control of the auxiliary transmission mechanism 9.

Figure 4:
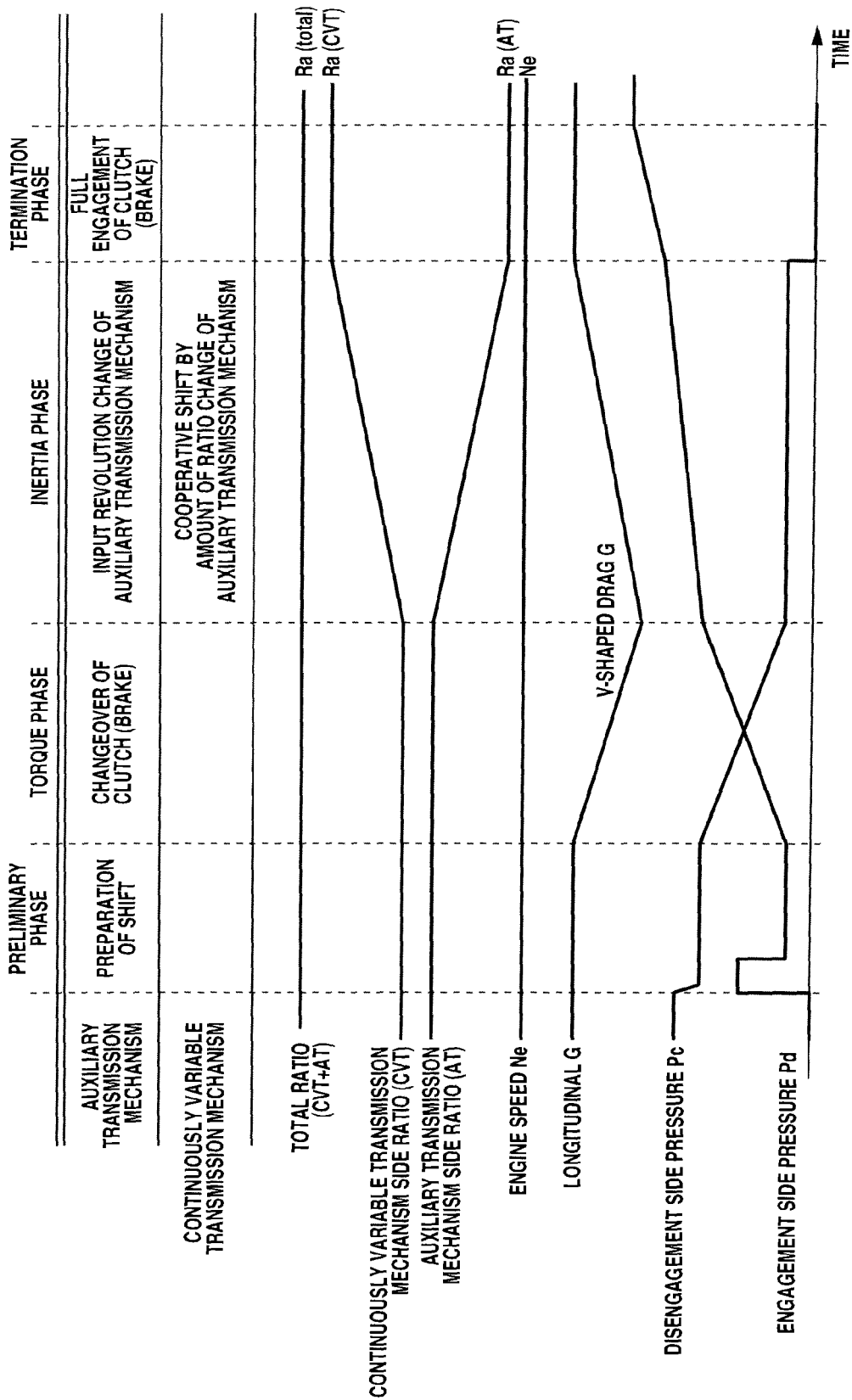
FIG. 4 is a time chart of a basic control flow of the automatic transmission mechanism.

Such shift control is called the cooperative shift control. As shown in FIG. 4, a change of a transmission ratio (hereinafter called an auxiliary transmission side ratio) $Ra_{(AT)}$ of the auxiliary transmission mechanism 9, which occurs because of the change of the shift position in the auxiliary transmission mechanism 9, is cancelled by (or compensated with) a change of the transmission ratio (the continuously variable transmission side ratio) $Ra_{(CVT)}$ of the CVT mechanism 8, which occurs because of the shift in the CVT mechanism 8. With this cancelling, a smooth shift can be achieved as if there is no change (or no fluctuation) in a transmission ratio (hereinafter called a total ratio) $Ra_{(total)}$ of the automatic transmission mechanism 4 as a whole.

As an example, in a case where an upshift of the shift position from the forward $1^{st}$ speed to the forward $2^{nd}$ speed in the auxiliary transmission mechanism 9 is performed, by performing a downshift of the CVT mechanism 8 at the same time as this upshift of the auxiliary transmission mechanism 9, the shift can be performed while maintaining the input revolution speed $N_i$ of the automatic transmission mechanism 4, which is formed by the both transmission mechanisms 8, 9, constant. Hence, when executing the cooperative shift control of the automatic transmission mechanism 4, an inertia torque and a shift shock which occur upon the upshift of the auxiliary transmission mechanism 9 are suppressed, then the smooth shift can be achieved as if the shift is being carried out by the CVT mechanism 8.

As described above, the automatic transmission mechanism 4 is capable of realizing a wide ratio coverage by the CVT mechanism 8 that can continuously vary the transmission ratio and the auxiliary transmission mechanism 9 that can select a certain shift position from a plurality of the shift positions.

That is to say, since the automatic transmission mechanism 4 has the both transmission mechanisms 8, 9, namely by combining the CVT mechanism 8 and the auxiliary transmission mechanism 9 with the hydraulic control valve unit 10 and the transmission controller 11 being the transmission control section (or transmission control means), an expanded ratio coverage can be gained as compared with a ratio coverage that is gained by only either one of the transmission mechanisms 8, 9.

Here, the automatic transmission of the present invention has the lock-up clutch $C_L$ in addition to the automatic transmission mechanism 4. In the shift map in FIG. 3, a lock-up area (e.g. an area of the 2→1 shift down line or less and an area of the 1→2 shift up line or more) where the lock-up clutch $C_L$ is locked up (i.e. is engaged) and a converter area (e.g. an area except the lock-up area) where the lock-up clutch $C_L$ is unlocked (i.e. is disengaged or released), are present. The lock-up clutch $C_L$ is also controlled on the basis of the vehicle speed VSP and the throttle opening TVO.

With this, the transmission controller 11 sends a command to the hydraulic control valve unit 10, then engagement/disengagement of the lock-up clutch $C_L$ is controlled while executing the slip-control according to the vehicle travelling (or operating) condition. Thus, in the present embodiment, the hydraulic control valve unit 10 and the transmission controller 11 also correspond to the lock-up clutch control section 103.

Here, with regard to an engagement part of the lock-up clutch $C_L$ etc., in a state where an input torque $T_{c(i)}$ of the engagement part is a positive torque (such torque that an input side of the engagement part is a driving side), i.e. in a case of a so-called power-ON state, since force acts in a direction that increases an input side revolution speed (hereinafter, an engagement part input revolution speed) $N_{c(i)}$ of the engagement part, when reducing or lowering the capacity (the supply pressure) of the engagement part, the engagement part input revolution speed $N_{c(i)}$ increases.

On the other hand, when generating the slip at the engagement part in the power-ON state, a target input revolution speed, which is higher with respect to an engagement input revolution speed (input revolution speed when engaged) $N_{c(i)}(c)$ by a predetermined revolution speed, is set as a target input revolution speed $N_{c(i)}(0)$ of the engagement part, then the slip-control is carried out using the capacity according to this target input revolution speed $N_{c(i)}(0)$.

Therefore, in the slip-control in the power-ON state, a feedback correction (hereinafter, revolution F/B correction) for the engagement part input revolution speed $N_{c(i)}$ is made so that when the engagement part input revolution speed $N_{c(i)}$ increases, this revolution increase is suppressed by increasing the capacity of the engagement part, and also when the engagement part input revolution speed $N_{c(i)}$ decreases, this revolution decrease is suppressed by reducing the capacity of the engagement part.

In contrast, in a state where the input torque $T_{c(i)}$ of the engagement part is a negative torque (such torque that an output side of the engagement part is the driving side), i.e. in a case of a so-called power-OFF state, since the force acts in a direction that decreases the engagement part input revolution speed $N_{c(i)}$, when reducing the capacity of the engagement part, the engagement part input revolution speed $N_{c(i)}$ also decreases.

On the other hand, when generating the slip at the engagement part in the power-OFF state, the target input revolution speed, which is lower with respect to the engagement input revolution speed (the input revolution speed when engaged) $N_{c(i)}(c)$ by a predetermined revolution speed, is set as the target input revolution speed $N_{c(i)}(0)$ of the engagement part, then the slip-control is carried out using the capacity according to this target input revolution speed $N_{c(i)}(0)$.

Therefore, in the slip-control in the power-OFF state, the revolution F/B correction for the engagement part input revolution speed $N_{c(i)}$ is made so that when the engagement part input revolution speed $N_{c(i)}$ decreases, this revolution decrease is suppressed by increasing the capacity of the engagement part, and also when the engagement part input revolution speed $N_{c(i)}$ increases, this revolution increase is suppressed by reducing the capacity of the engagement part.

In such cases, however, when the power-ON/OFF state is misjudged such that the power state is judged to be the power-OFF state but it is actually the power-ON state, even if the engagement part input revolution speed $N_{c(i)}$ is changed in a direction moving away from the target input revolution speed $N_{c(i)}(0)$ due to the misjudgment, this change cannot be suppressed.

Figure 5:
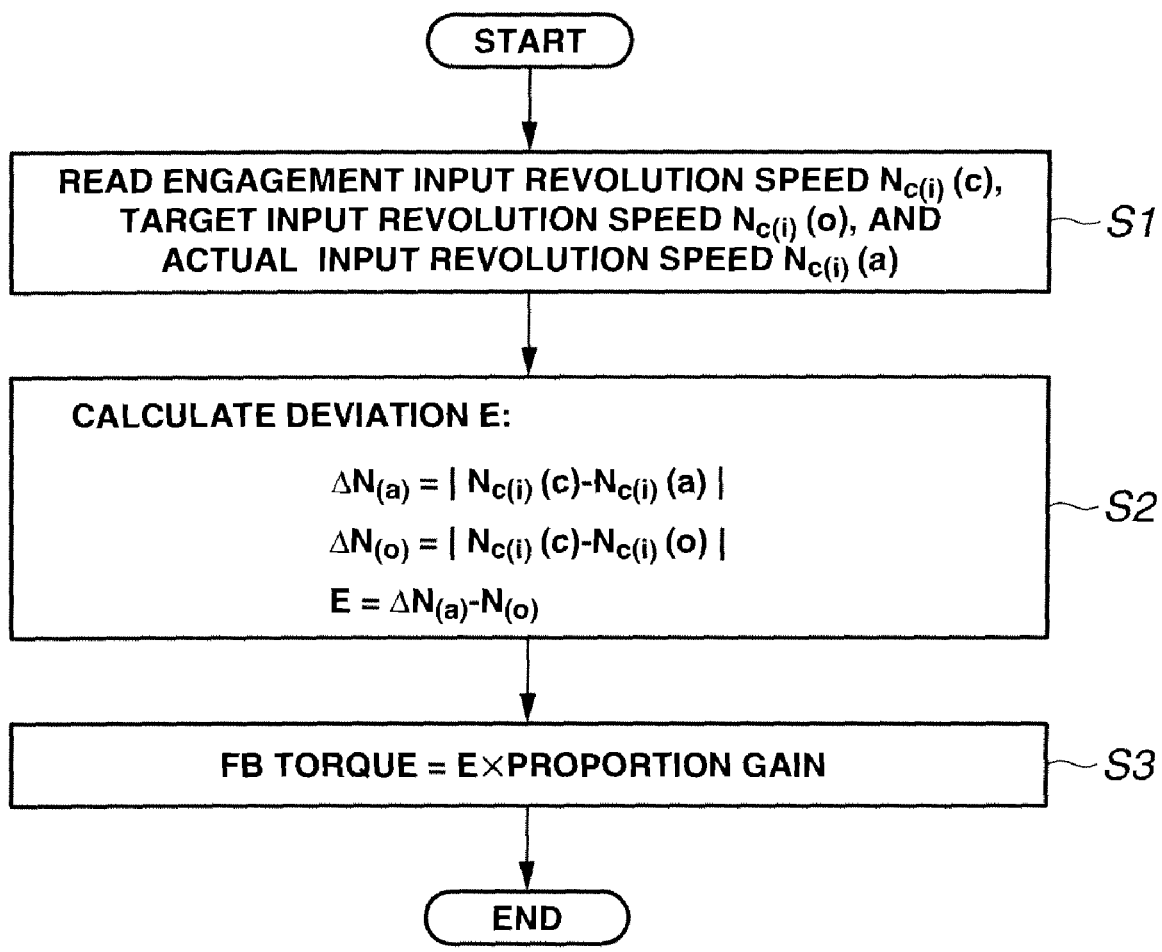
FIG. 5 is a flow chart showing a control flow executed by the control apparatus of the automatic transmission.

Thus, in the present embodiment, by executing a control flow shown in FIG. 5 by the transmission controller 11, an appropriate revolution F/B correction value is calculated, and the capacity of the engagement part is controlled on the basis of this revolution F/B correction value. FIG. 5 is the flow in which a proportional control (feedback control) of the input torque $T_{c(i)}$ of the engagement part is executed, but it could be applied to a flow in which a PID control (feedback control) is executed.

The control flow in FIG. 5 is executed, for instance, with a start of the slip-control being a trigger.

At step S1, the engagement input revolution speed $N_{c(i)}(c)$, the target input revolution speed $N_{c(i)}(0)$, and an actual input revolution speed $N_{c(i)}(a)$ that is an actual input revolution speed $N_{c(i)}$, are read.

The engagement input revolution speed $N_{c(i)}(c)$ is a revolution speed that is a reference of the slip-control. For example, an input revolution speed $N_{c(i)}$ upon the engagement last time is stored, and it is used as the engagement input revolution speed $N_{c(i)}(c)$. As for the target input revolution speed $N_{c(i)}(0)$, for example, as described above, the target input revolution speed $N_{c(i)}(0)$ that is properly calculated on the basis of the vehicle travelling (or operating) condition such as the vehicle speed VSP and the throttle opening TVO, is read. Further, with respect to the actual input revolution speed $N_{c(i)}(a)$, for example, a calculated value calculated from a detection value that is directly or indirectly detected by the revolution speed sensor is read.

At step S2, first, an absolute value (hereinafter, an actual input revolution speed difference absolute value) $\Delta N_{(a)}$ of a value (a difference) obtained by subtracting the actual input revolution speed $N_{c(i)}(a)$ from the engagement input revolution speed $N_{c(i)}(c)$ is calculated (i.e. $\Delta N_{(a)} = |N_{c(i)}(c) - N_{c(i)}(a)|$). And also, an absolute value (hereinafter, a target input revolution speed difference absolute value) $\Delta N_{(0)}$ of a value (a difference) obtained by subtracting the target input revolution speed $N_{c(i)}(0)$ from the engagement input revolution speed $N_{c(i)}(c)$ is calculated (i.e. $\Delta N_{(0)} = |N_{c(i)}(c) - N_{c(i)}(0)|$).

Next, by subtracting the target input revolution speed difference absolute value $\Delta N_{(0)}$ from the actual input revolution speed difference absolute value $\Delta N_{(a)}$, a deviation E is determined (i.e. $E = \Delta N_{(a)} - \Delta N_{(0)}$).

At step S3, a feedback torque (FB torque) according to the deviation E is calculated.

When the deviation E is positive (E>0), this means that the actual input revolution speed difference absolute value $\Delta N_{(a)}$ is greater than the target input revolution speed difference absolute value $\Delta N_{(0)}$, then an FB torque $T_1$ which increases a torque T (capacity) of the engagement part is calculated by multiplying the deviation E by a proportion gain $G_1$. With this, when executing the feedback control based on the FB torque $T_1$ on the torque T, the torque T can be increased.

In contrast, when the deviation E is negative (E<0), this means that the actual input revolution speed difference absolute value $\Delta N_{(a)}$ is less than the target input revolution speed difference absolute value $\Delta N_{(0)}$, then an FB torque $T_2$ which decreases the torque T of the engagement part is calculated by multiplying the deviation E by a proportion gain $G_2$. With this, when executing the feedback control based on the FB torque $T_2$ on the torque T, the torque T can be decreased.

Furthermore, when the deviation E is zero (E=0), this means that the actual input revolution speed difference absolute value $\Delta N_{(a)}$ is equal to the target input revolution speed difference absolute value $\Delta N_{(0)}$, then an FB torque $T_3$ which maintains a previous torque T that is set before the deviation E is calculated is calculated by multiplying the deviation E by a proportion gain $G_3$. With this, when executing the feedback control based on the FB torque $T_3$ on the torque T, the torque T can be maintained at the previous torque T set before the deviation E is calculated.

According to the control flow, since the FB torque according to the deviation E can be calculated, when correcting the torque T of the engagement part by this FB torque, a required torque T can be determined. Therefore, it is possible to perform the feedback control of the engagement part input revolution speed $N_{c(i)}$ by using the FB torque T. However, in the present embodiment, by converting the FB torque as the supply pressure (capacity) of the engagement part, the feedback control of the engagement part input revolution speed $N_{c(i)}$ is carried out. Here, in the present invention, the capacity of the engagement part includes both of the fluid pressure and the torque.

For instance, when the misjudgment occurs such that the power state is judged to be the power-OFF state but it is actually the power-ON state, according to the present embodiment, by the comparison between the actual input revolution speed difference absolute value $\Delta N_{(a)}$ and the target input revolution speed difference absolute value $\Delta N_{(0)}$, the engagement part input revolution speed $N_{c(i)}$ is controlled as follows.

Figure 6:
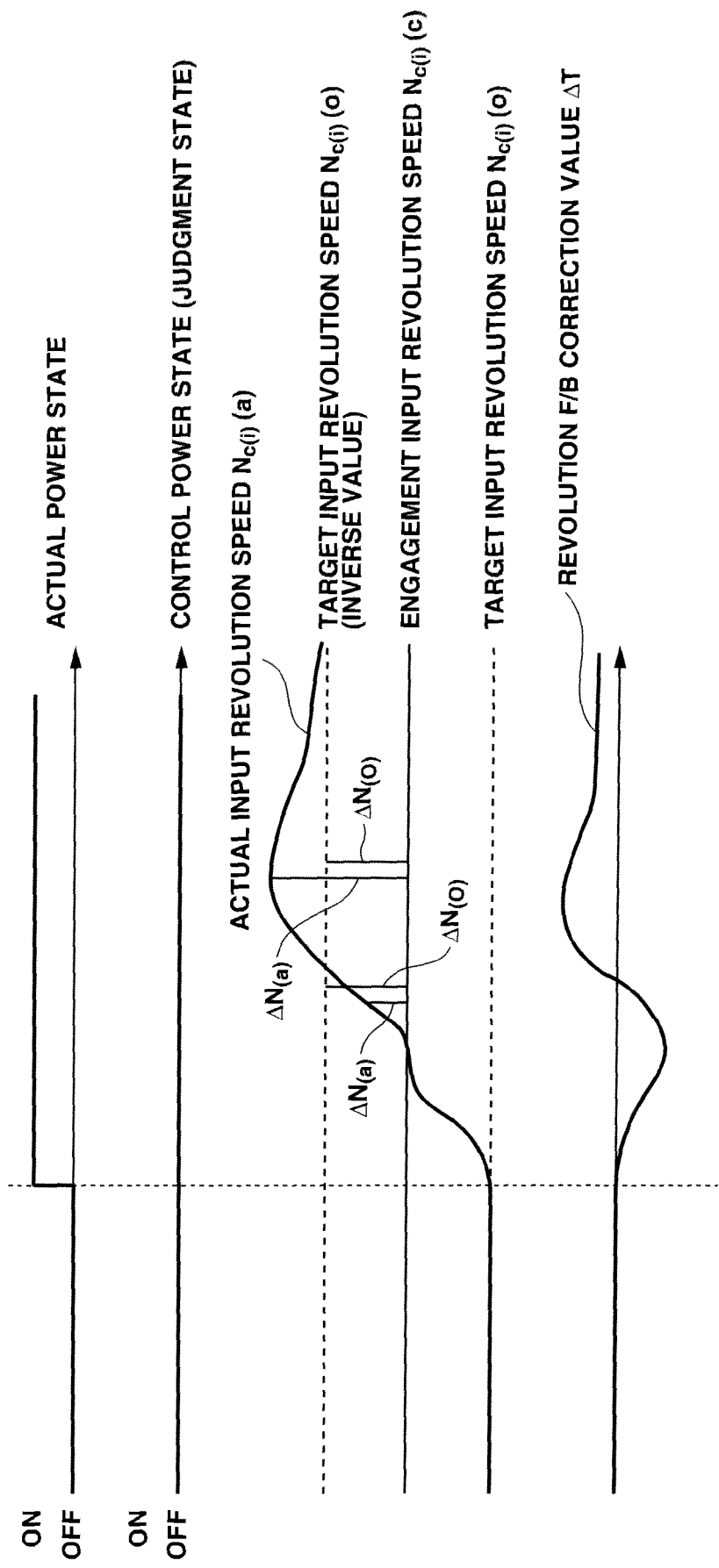
FIG. 6 is a time chart showing a state in which an input revolution speed of an engagement part is controlled according to the present invention, when a power state is misjudged to be a power-OFF state, but it is actually a power-ON state.

FIG. 6 is a time chart showing a state of the control of the engagement part input revolution speed $N_{c(i)}$ when the misjudgment occurs such that the power state is judged to be the power-OFF state but it is actually the power-ON state.

As can be seen in FIG. 6, although the actual power state is the power-ON state, the transmission controller 11 has misjudged that the power-OFF state continues (the power-OFF state remains unchanged).

Because of this, when the actual input revolution speed $N_{c(i)}(a)$ becomes higher than the engagement input revolution speed $N_{c(i)}(c)$ away from the target input revolution speed $N_{c(i)}(0)$ and the actual input revolution speed difference absolute value $\Delta N_{(a)}$ is less than the target input revolution speed difference absolute value $\Delta N_{(0)}$ (E<0), the engagement part input revolution speed $N_{c(i)}$ is judged to be lower than an inverse value of the target input revolution speed $N_{c(i)}(0)$, then the revolution F/B correction is executed so that the capacity of the engagement part is reduced as shown by $\Delta T$ in FIG. 6. With this execution, since the actual input revolution speed $N_{c(i)}(a)$ increases, it is possible that the engagement part input revolution speed $N_{c(i)}$ converges on the inverse value of the target input revolution speed $N_{c(i)}(0)$.

In contrast, when the actual input revolution speed $N_{c(i)}(a)$ becomes higher than the inverse value of the target input revolution speed $N_{c(i)}(0)$ away from the inverse value and the actual input revolution speed difference absolute value $\Delta N_{(a)}$ is greater than the target input revolution speed difference absolute value $\Delta N_{(0)}$ (E>0), the actual input revolution speed $N_{c(i)}(a)$ is judged to be higher than the inverse value of the target input revolution speed $N_{c(i)}(0)$, then the revolution F/B correction is executed so that the capacity of the engagement part is increased as shown by $\Delta T$ in FIG. 6. With this execution, since the actual input revolution speed $N_{c(i)}(a)$ decreases, it is possible that the actual input revolution speed $N_{c(i)}(a)$ converges on the inverse value of the target input revolution speed $N_{c(i)}(0)$.

Consequently, in general, because of the misjudgment, i.e. because the power state is judged to be the power-OFF state but it is actually the power-ON state, a surge of the input revolution speed $N_{c(i)}$ might occur. However, in the present invention, even in the state where the surge of the input revolution speed $N_{c(i)}$ occurs because of the misjudgment, since the actual input revolution speed $N_{c(i)}(a)$ converges on a constant or certain revolution speed (the inverse value of the target input revolution speed $N_{c(i)}(0)$), such surge can be suppressed.

Figure 7:
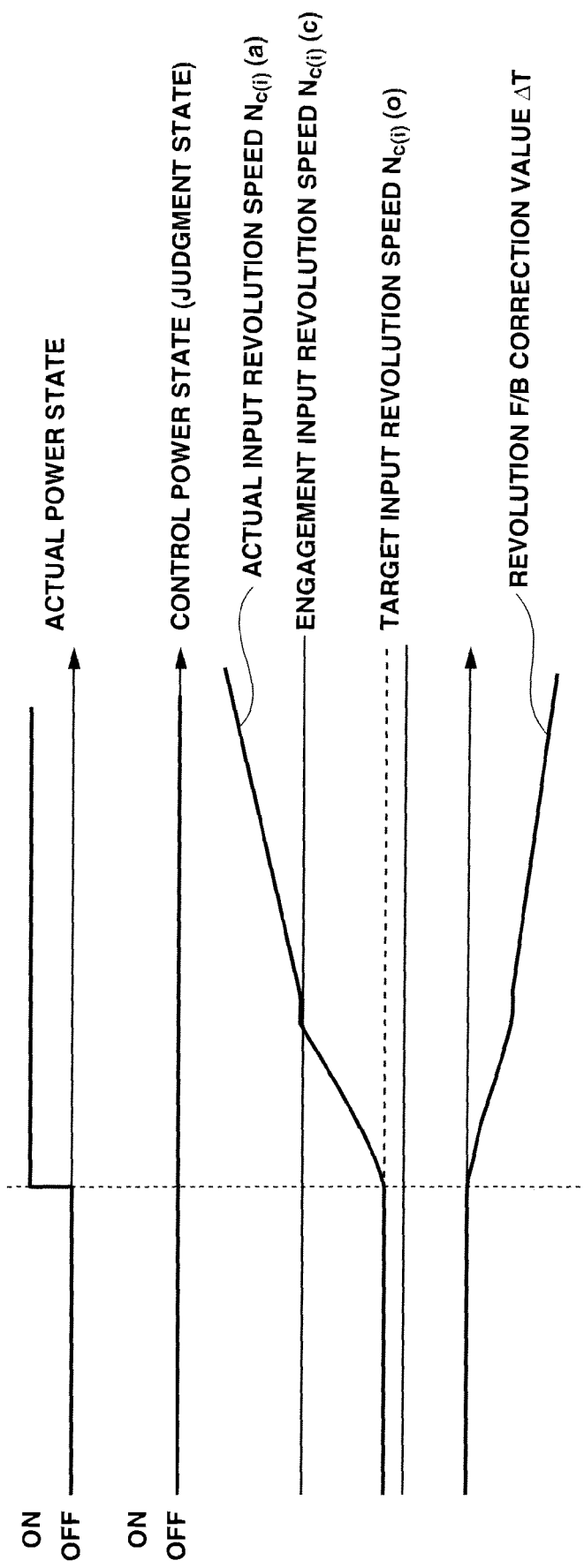
FIG. 7 is a time chart showing a state in which the input revolution speed of the engagement part is controlled by a related art technique, when the power state is misjudged to be the power-OFF state, but it is actually the power-ON state.

On the other hand, FIG. 7 is a time chart showing a control state of a related art technique. As can be seen in FIG. 7, in the related art control, when the misjudgment occurs such that the power state is judged to be the power-OFF state but it is actually the power-ON state, in order to perform the slip-control for the power-OFF state, the following control is executed.

In the related art control, while the power state is being misjudged to be the power-OFF state, the revolution F/B correction for the engagement part input revolution speed $N_{c(i)}$ is executed. That is, in the misjudgment state, the revolution F/B correction is made so that when the engagement part input revolution speed $N_{c(i)}$ decreases, the capacity of the engagement part is increased, and also when the engagement part input revolution speed $N_{c(i)}$ increases, the capacity of the engagement part is reduced.

However, because the power state is the power-ON state in actual fact, as shown in FIG. 7, although the actual input revolution speed $N_{c(i)}(a)$ increases simultaneously with a change to the power-ON and becomes higher than the engagement input revolution speed $N_{c(i)}(c)$ away from the target input revolution speed $N_{c(i)}(0)$, since the power-OFF state is judged as the slip-control, the revolution F/B correction is made so that the capacity of the engagement part is reduced as shown by $\Delta T$ in FIG. 7.

In addition, because of the power-ON state in actual fact, this slip-control gives rise to further increase in the actual input revolution speed $N_{c(i)}(a)$. For this reason, in the related art technique, it is impossible to suppress the change of the actual input revolution speed $N_{c(i)}(a)$ away from the target input revolution speed $N_{c(i)}(0)$.

Furthermore, according to the present invention, even when the misjudgment occurs such that the power state is judged to be the power-ON state but it is actually the power-OFF state, by the comparison between the actual input revolution speed difference absolute value $\Delta N_{(a)}$ and the target input revolution speed difference absolute value $\Delta N_{(0)}$, the engagement part input revolution speed $N_{c(i)}$ is controlled as follows.

Figure 8:
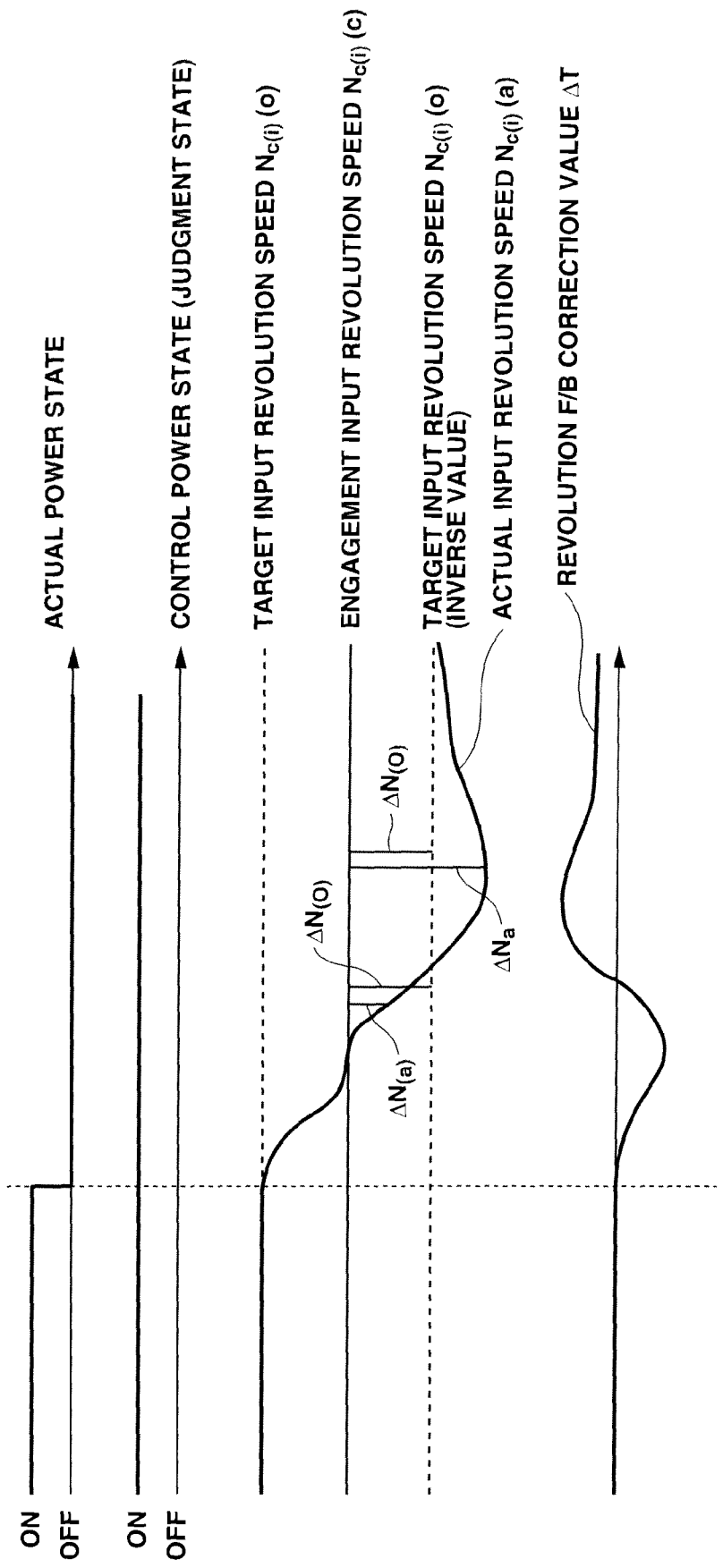
FIG. 8 is a time chart showing a state in which the input revolution speed of the engagement part is controlled according to the present invention, when the power state is misjudged to be a power-ON state, but it is actually a power-OFF state.

FIG. 8 is a time chart showing a state of the control of the engagement part input revolution speed $N_{c(i)}$ when the misjudgment occurs such that the power state is judged to be the power-ON state but it is actually the power-OFF state.

As can be seen in FIG. 8, although the actual power state is the power-OFF state, the transmission controller 11 has misjudged that the power-ON state continues (the power-ON state remains unchanged).

Because of this, when the actual input revolution speed $N_{c(i)}(a)$ becomes lower than the engagement input revolution speed $N_{c(i)}(c)$ away from the target input revolution speed $N_{c(i)}(0)$ and the actual input revolution speed difference absolute value $\Delta N_{(a)}$ is less than the target input revolution speed difference absolute value $\Delta N_{(0)}$ (E<0), the engagement part input revolution speed $N_{c(i)}$ is judged to be higher than an inverse value of the target input revolution speed $N_{c(i)}(0)$, then the revolution F/B correction is executed so that the capacity of the engagement part is reduced as shown by $\Delta T$ in FIG. 8. With this execution, since the actual input revolution speed $N_{c(i)}(a)$ decreases, it is possible that the actual input revolution speed $N_{c(i)}(a)$ converges on the inverse value of the target input revolution speed $N_{c(i)}(0)$.

In contrast, when the actual input revolution speed $N_{c(i)}(a)$ becomes lower than the inverse value of the target input revolution speed $N_{c(i)}(0)$ away from the inverse value and the actual input revolution speed difference absolute value $\Delta N_{(a)}$ is greater than the target input revolution speed difference absolute value $\Delta N_{(0)}$ (E>0), the actual input revolution speed $N_{c(i)}(a)$ is judged to be lower than the inverse value of the target input revolution speed $N_{c(i)}(0)$, then the revolution F/B correction is executed so that the capacity of the engagement part is increased as shown by $\Delta T$ in FIG. 8. With this execution, since the actual input revolution speed $N_{c(i)}(a)$ increases, it is possible that the actual input revolution speed $N_{c(i)}(a)$ converges on the inverse value of the target input revolution speed $N_{c(i)}(0)$.

Consequently, in general, because of the misjudgment, i.e. because the power state is judged to be the power-ON state but it is actually the power-OFF state, a decrease of the input revolution speed $N_{c(i)}$ might occur. However, in the present invention, even in the state where the decrease of the input revolution speed $N_{c(i)}$ occurs because of the misjudgment, since the actual input revolution speed $N_{c(i)}(a)$ converges on a constant or certain revolution speed (the inverse value of the target input revolution speed $N_{c(i)}(0)$), such decrease can be suppressed.

Figure 9:
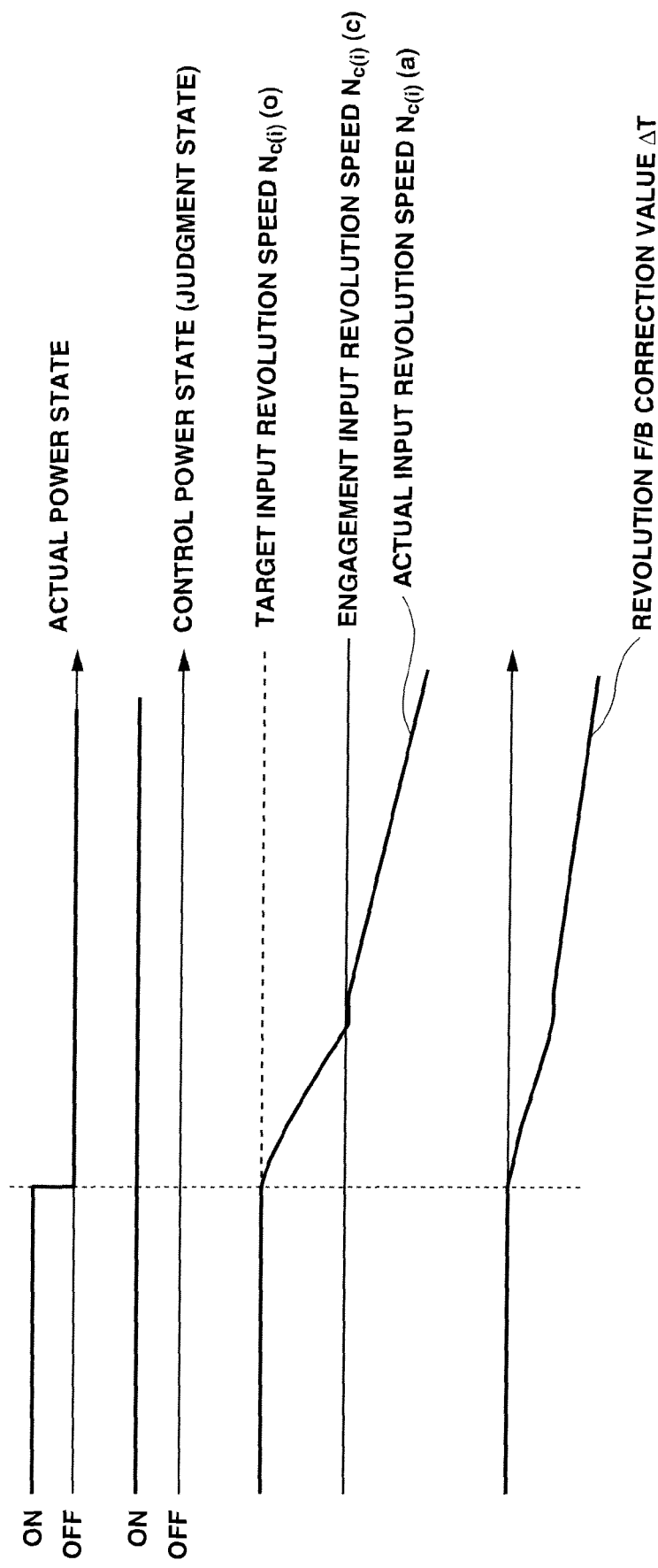
FIG. 9 is a time chart showing a state in which the input revolution speed of the engagement part is controlled by the related art technique, when the power state is misjudged to be the power-ON state, but it is actually the power-OFF state.

On the other hand, FIG. 9 is a time chart showing a control state of the related art technique. As can be seen in FIG. 9, in the related art control, when the misjudgment occurs such that the power state is judged to be the power-ON state but it is actually the power-OFF state, in order to perform the slip-control for the power-ON state, the following control is executed.

In the related art control, while the power state is being misjudged to be the power-ON state, the revolution F/B correction for the engagement part input revolution speed $N_{c(i)}$ is executed. That is, in the misjudgment state, the revolution F/B correction is made so that when the engagement part input revolution speed $N_{c(i)}$ increases, the capacity of the engagement part is increased, and also when the engagement part input revolution speed $N_{c(i)}$ decreases, the capacity of the engagement part is reduced.

However, because the power state is the power-OFF state in actual fact, as shown in FIG. 9, although the actual input revolution speed $N_{c(i)}(a)$ decreases simultaneously with a change to the power-OFF and becomes lower than the engagement input revolution speed $N_{c(i)}(c)$ away from the target input revolution speed $N_{c(i)}(0)$, since the power-ON state is judged as the slip-control, the revolution F/B correction is made so that the capacity of the engagement part is reduced as shown by $\Delta T$ in FIG. 9.

In addition, because of the power-OFF state in actual fact, this slip-control gives rise to further decrease in the actual input revolution speed $N_{c(i)}(a)$. For this reason, in the related art technique, it is impossible to suppress the change of the actual input revolution speed $N_{c(i)}(a)$ away from the target input revolution speed $N_{c(i)}(0)$.

Here, in the present embodiment, when the actual input revolution speed difference absolute value $\Delta N_{(a)}$ is equal to the target input revolution speed difference absolute value $\Delta N_{(0)}$, this means or judges that the engagement part input revolution speed $N_{c(i)}$ reaches the target input revolution speed $N_{c(i)}(0)$, then a capacity of the engagement part, which is set before the comparison between the actual input revolution speed difference absolute value $\Delta N_{(a)}$ and the target input revolution speed difference absolute value $\Delta N_{(0)}$, is maintained.

Thus, in the present invention, even in the case where the surge of the input revolution speed $N_{c(i)}$ and the decrease of the input revolution speed $N_{c(i)}$ occur due to the misjudgment of the power-ON/OFF state, by maintaining the actual input revolution speed $N_{c(i)}(a)$ at the constant or certain revolution speed (revolution speed before the change of the power-ON/OFF state), such surge and such decrease can be suppressed.

Additionally, in the present embodiment, when to performing the slip-control of the lock-up clutch $C_L$, the feedback control in consideration of the misjudgment of the power-ON/OFF state is also performed. In this case, propagation of vibrations caused by a torque change due to depression of an accelerator pedal or abrupt braking can be is suppressed. Further, in a steady state in which there is no torque change at the lock-up clutch $C_L$, since a steady slip arises, the propagation of vibrations can be suppressed. With this, it is possible to extend the lock-up area and also to improve fuel economy without impairment of drivability.

On the other hand, with regard to the so-called changeover shift which is achieved by disengaging one engagement part and engaging the other engagement part in the transmission such as the auxiliary transmission mechanism 9, because its shift is realized by the changeover between the engagement side and the disengagement side, there is a problem that interlock and the surge of the revolution speed may arise.

Therefore, during the changeover shift, by slip-controlling the engagement part of the engagement/disengagement side engagement parts such as the low brake LR/B and the high clutch H/C which suppress or control a revolution speed change of an input revolution speed $N_{i(AT)}$ of the auxiliary transmission mechanism 9, such problem of the interlock and the surge is prevented.

Thus, in the present embodiment, also when performing the above slip-control, the above-mentioned feedback control in consideration of the misjudgment of the power-ON/OFF state is also performed.

In a case where the low brake LR/B or the high clutch H/C is engaged, an exact torque capacity of its engagement part by a pressing force (the fluid pressure) at that time is not determined. However, when the slip is maintained even slightly, in the case where there is no revolution change (a slight revolution change), it can be said that the input torque $T_{c(i)}$ of the engagement part and the torque capacity almost balance out, by an equation of motion about rotating system.

Therefore, the target input revolution speed $N_{c(i)}(0)$ upon the slip-control could be, for example, a small speed such as a few tens of revolution speeds, with respect to the engagement input revolution speed $N_{c(i)}(c)$. However, if a slip amount is set to be too large, not only this gives an awkward feeling that results from the revolution change to a driver, but since heat at the engagement part rises, there is room for improvement in durability of the engagement part. The target input revolution speed $N_{c(i)}(0)$ upon the slip-control could be set to the same revolution speed in the both power-ON/OFF states.

Figure 10:
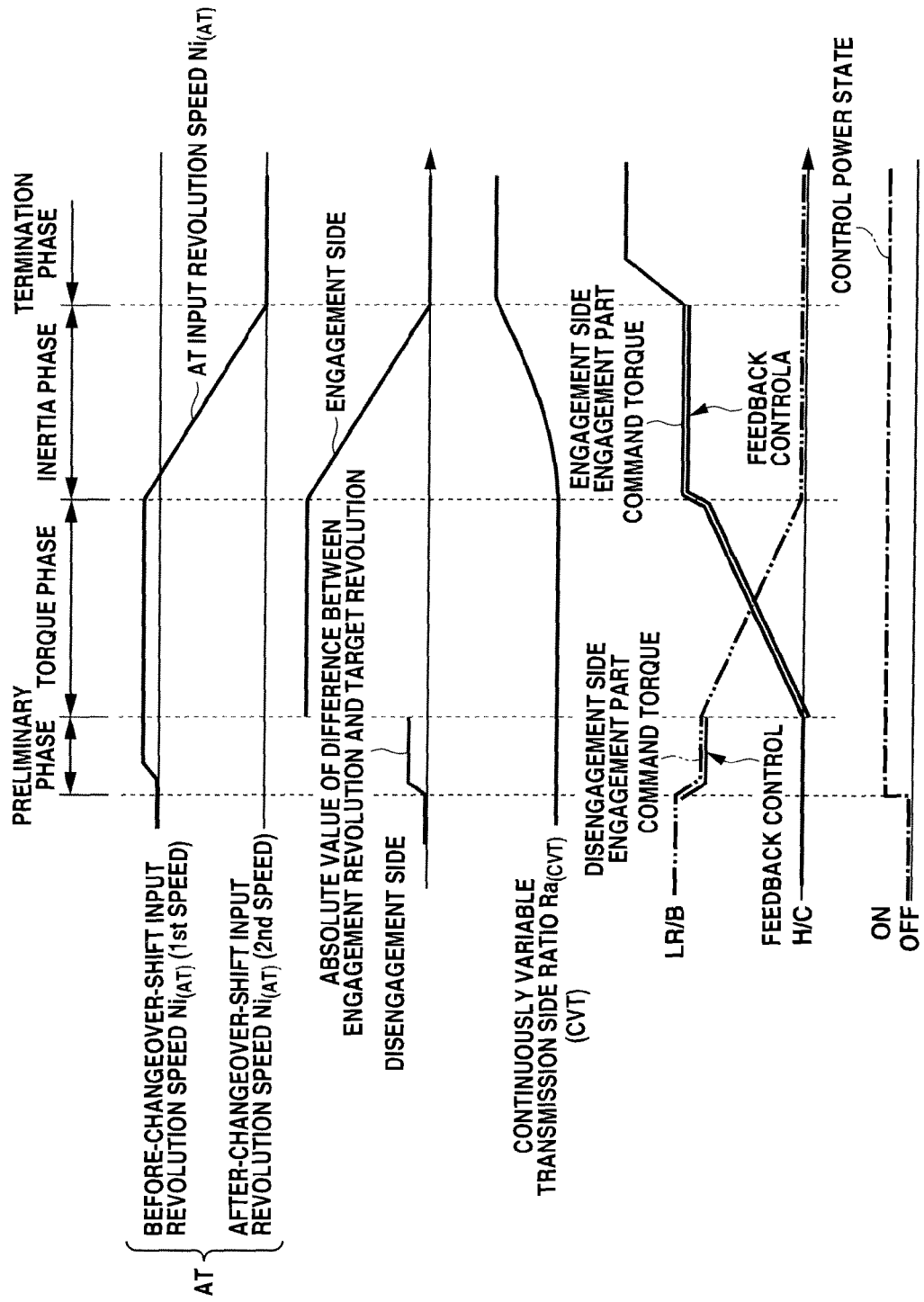
FIG. 10 is a time chart showing change of time series at a power-ON up-shift, concerning an auxiliary transmission mechanism, together with a feedback control of the present invention.

For example, as shown in FIG. 10, a so-called power-ON up-shift that performs the upshift by becoming the power-ON state will be explained as the example. In the power-ON up-shift, a preliminary (or preparation) phase starts with the power-ON being a trigger. Subsequent to the preliminary phase, a so-called torque phase comes before a so-called inertia phase. The torque phase is a phase in which the changeover of the torque is carried out by dividing the input torque of the auxiliary transmission mechanism 9 between the low brake LR/B and the high clutch H/C. The inertia phase is a phase in which the auxiliary transmission mechanism side input revolution speed $N_{i(AT)}$ changes from a before-changeover-shift input revolution speed ($1^{st}$ speed) to an after-changeover-shift input revolution speed ($2^{nd}$ speed).

During the torque phase, since the changeover of the torque is carried out between the engagement/disengagement sides, when maintaining the slight or micro slip in this torque phase, a total torque capacity of the engagement and disengagement sides becomes equal to the input torque $T_{c(i)}$. Then, such an ideal shift that there is no interlock and no surge can be realized.

In the present embodiment, first, in order to achieve the micro slip in the torque phase, the shift is judged, then in the preliminary phase before starting the torque phase, by executing the slip-control of the low brake LR/B that is a disengagement side brake (i.e. an off-going brake), a condition in which the total torque capacity of a disengagement side torque capacity (low brake LR/B side torque capacity) and an engagement side torque capacity (high clutch H/C side torque capacity) (it is almost zero in the preliminary phase) becomes equal to the input torque is achieved.

Next, this condition shifts to the torque phase, and by executing the slip-control of the high clutch H/C that is an engagement side clutch (i.e. an on-coming clutch), the condition in which the total torque capacity of the disengagement side torque capacity and the engagement side torque capacity becomes equal to the input torque T is maintained also during the changeover shift.

Afterwards, in the inertia phase in which the revolution change occurs and the auxiliary transmission mechanism side input revolution speed $N_{i(AT)}$ changes from the before-changeover-shift input revolution speed to the after-changeover-shift input revolution speed, the revolution speed control is executed by the same control as the above slip-control in consideration of the misjudgment of the power-ON/OFF state so that the auxiliary transmission mechanism side input revolution speed $N_{i(AT)}$ follows a locus of an auxiliary transmission mechanism side target input revolution speed $N_{i(AT)}(0)$.

In the case where the CVT mechanism 8 to achieve the target transmission ratio by cooperating with the shift control of the auxiliary geared transmission mechanism 9 is employed like the present embodiment, when the control of the engagement part of the present invention is applied to the low brake LR/B and the high clutch H/C in the auxiliary transmission mechanism 9, the surge and decrease of the input revolution speed $N_{i(AT)}$ of the auxiliary transmission mechanism 9 can be suppressed even when the cooperative shift control is executed in the state having the misjudgment of the power-ON/OFF state. With this, also as the power train as a whole, a stable cooperative shift control that suppresses a change of the total ratio $Ra_{(total)}$ can be realized.

Additionally, the feedback control in consideration of the misjudgment of the power-ON/OFF state is not limited to the above slip-control in the changeover shifting state, it could also be executed together with the slip-control in a non-shift state in which the changeover shift is not being carried out.

In the case where the feedback control is executed in the non-shift state, by providing the steady slip in the non-shift state in which no torque change arises, the propagation of vibrations can be suppressed. Then, a vehicle vibration and noises generated during a steady travel in which there is no torque change, e.g. vehicle vibration and noises generated when coasting, are suppressed. Thus, when the feedback control is executed together with the slip-control in the non-shift state, a driving feeling or the drivability can be improved.

Furthermore, as a matter of course, the feedback control in consideration of the misjudgment of the power-ON/OFF state can also be used in the automatic transmission mechanism that is formed by the auxiliary transmission mechanism 9 itself. In this case, even if the changeover shift is carried out in the state having the misjudgment of the power-ON/OFF state, it is possible to realize the stable slip-control in which the surge and decrease of the input revolution speed are suppressed during the changeover shift. In addition, since the stable slip-control is achieved, the input revolution speed can be maintained at a certain slip. Then, when the control of the present invention is executed particularly in the changeover shifting state (during the progress of the changeover shift), the ideal shift having no interlock can be achieved, same as the automatic transmission mechanism 4 of the present invention.

Moreover, in a case where the CVT mechanism 8 and the auxiliary transmission mechanism 9 are connected in series like the present embodiment, even when it is difficult to detect such a state that a sudden torque change due to the abrupt braking or going over of a bump occurs, the stable slip-control against such sudden torque change is executed in the lock-up clutch and the auxiliary transmission mechanism 9. With this, a belt-slip of the CVT mechanism 8 can be suppressed, and this provides an improvement in durability of the belt 8c.

Further, as described above, when generating the slip at the engagement part in the power-ON state, the target input revolution speed, which is higher with respect to the engagement input revolution speed $N_{c(i)}(c)$ by the predetermined revolution speed, is set as the target input revolution speed $N_{c(i)}(0)$ of the engagement part. And when generating the slip at the engagement part in the power-OFF state, the target input revolution speed, which is lower with respect to the engagement input revolution speed $N_{c(i)}(c)$ by the predetermined revolution speed, is set as the target input revolution speed $N_{c(i)}(0)$ of the engagement part. By setting the target input revolution speed in this way, since a torque transmissibility (torque transmission coefficient) between input and output of the engagement part becomes 1 even at the change of the power-ON/OFF state, a stable power transmission can be realized.

Figure 11:
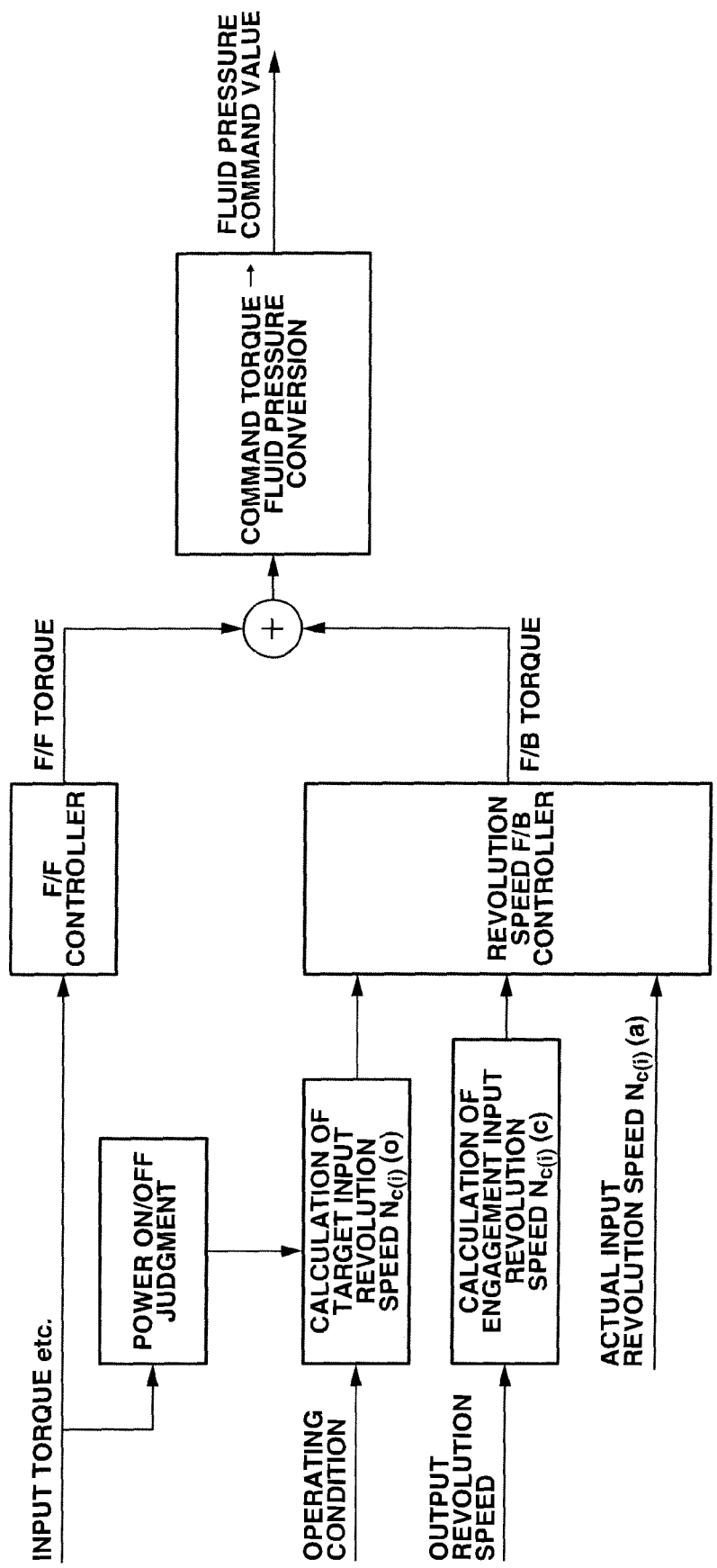
FIG. 11 is a control diagram showing a manner that calculates a command fluid pressure for each of engagement and disengagement sides of the engagement part, executed by a change of the power-ON/OFF in a transmission controller.

Here, with regard to a command fluid pressure (the supply pressure) to be supplied to each engagement part of the lock-up clutch $C_L$ and the auxiliary transmission mechanism 9, it is calculated by the transmission controller 11 as shown by flows in FIG. 11. Then by sending this fluid pressure command value to the hydraulic control valve unit 10, the control is performed.

The command fluid pressure for the engagement part is calculated by converting a command torque for the engagement part to the command fluid pressure. As for the command torque, as shown in FIG. 11, it is determined as an addition value of a F/F torque provided by a feed-forward control and the F/B torque provided by the feedback control. The F/F torque is determined on the basis of the input torque of the engagement part by a F/F controller. The F/B torque is determined by a revolution speed F/B controller.

The revolution speed F/B controller inputs the target input revolution speed $N_{c(i)}(0)$, the engagement input revolution speed $N_{c(i)}(c)$ and the actual input revolution speed $N_{c(i)}(a)$, and calculates the F/B torque on the basis of these information. As previously mentioned, the target input revolution speed $N_{c(i)}(0)$ is calculated according to the operating condition such as the vehicle speed VSP and the throttle opening TVO. As for the engagement input revolution speed $N_{c(i)}(c)$, for example, it is determined according to an output revolution speed $N_{c(o)}$ of the engagement part which is calculated from the detection value directly or indirectly detected by the revolution speed sensor. Further, the actual input revolution speed $N_{c(i)}(a)$ is calculated on the basis of the detection value directly or indirectly detected by the revolution speed sensor.

Although ON/OFF of the power can be judged through the accelerator pedal operation, each engagement part of the clutch and the brake has a function of bringing the input and output revolution speeds of the engagement part to the same revolution speed by its engagement.

Thus, in the present embodiment, from the change of the revolution speed of the auxiliary transmission mechanism 9, the change of the power-ON/OFF state is judged.

Figure 12A:
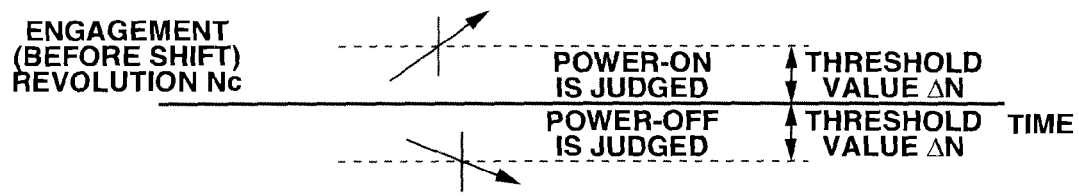
FIGS. 12A and 12B are drawings that explain a judgment manner of the power-ON/OFF state during non-shift or a preliminary phase, or during a shift shifting to a torque phase or an inertia phase.

As an embodiment, as shown in FIG. 12A, in the non-shift sate in which the changeover shift is not being carried out, or in the preliminary phase before shifting to the torque phase or the inertia phase in which the shift judgment is made and the changeover shift is going to be carried out, the engagement revolution speed $N_c$ of the engagement part (the low brake LR/B or the high clutch H/C) of the auxiliary transmission mechanism 9 is set as a reference, then when the automatic transmission input revolution speed $N_i$ increases by a preset threshold value $\Delta N$ or more with respect to this engagement revolution speed $N_c$, the power state is judged to be the power-ON. On the other hand, when the automatic transmission input revolution speed $N_i$ decreases by a preset threshold value $\Delta N$ or less, the power state is judged to be the power-OFF.

Figure 12B:
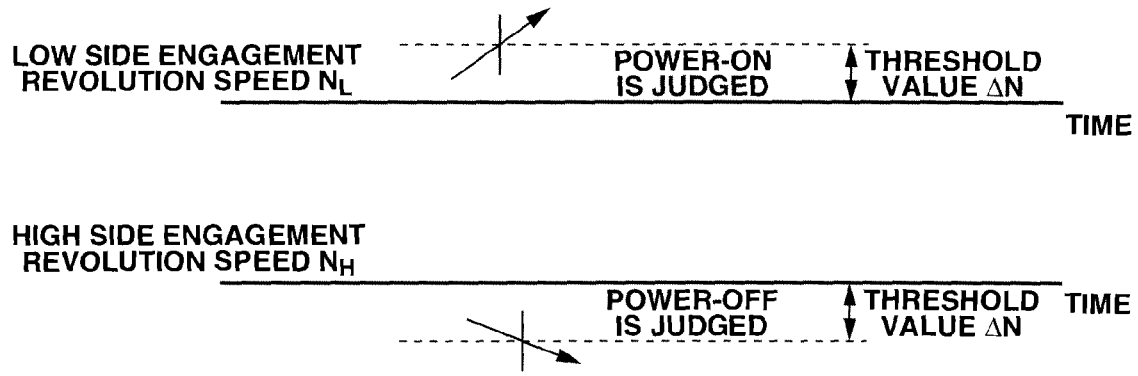

Further, in the shifting state in which the phase shifts to the torque phase or the inertia phase, as shown in FIG. 12B, an engagement revolution speed $N_{c(Low)}$ of the low shift position (the low brake LR/B) of the auxiliary transmission mechanism 9 is set as a reference, then when the automatic transmission input revolution speed $N_i$ increases by a preset threshold value $\Delta N$ or more with respect to this engagement revolution speed $N_{c(Low)}$, the power state is judged to be the power-ON. On the other hand, as for the power-OFF, an engagement revolution speed $N_{c(Hi)}$ of the high shift position (the high clutch H/C) of the auxiliary transmission mechanism 9 is set as a reference, then when the automatic transmission input revolution speed N, decreases by a preset threshold value $\Delta N$ or less with respect to this engagement revolution speed $N_{c(Hi)}$, the power state is judged to be the power-OFF. That is, in the present embodiment, the transmission controller 11 corresponds to a power-ON/OFF state judgment section (or power-ON/OFF state judgment means).

As explained above, by judging that the power-ON/OFF state is changed by the change of the revolution speed of the auxiliary transmission mechanism 9, even if the torque inputted from the drive source of the engine etc. to the auxiliary transmission mechanism 9 is a small torque that is close to zero, it is possible to judge the power-ON/OFF state accurately or correctly. Here, regarding the threshold value $\Delta N$, it can be properly set and changed according to driver's demand or car model etc. For instance, it could be set so that the slip of the low brake LR/B and the high clutch H/C can be surely judged, and it could be set to a small value (e.g. 20~50 revolution speed).

Although the present invention has been described above, it is not limited to the above embodiments. For example, the present invention could be applied to the case where the auxiliary transmission mechanism 9 itself is employed as the automatic transmission mechanism 4.

Furthermore, in the present invention, the control section 100 is formed by the system shown in FIG. 2, and this system corresponds to a control means of the present invention. However, the control means might change depending on a medium or element or component which governs or controls the engagement/disengagement. Moreover, in the case where the auxiliary transmission mechanism 9 itself is employed as the automatic transmission, the input revolution speed such as the target input revolution speed, which should be controlled by the control means, is the input revolution speed of the auxiliary transmission mechanism 9. Additionally, the auxiliary transmission mechanism 9 could be a multi-speed transmission mechanism that has two speeds or more.

The entire contents of Japanese Patent Application No. 2009-054035 filed on Mar. 6, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A control apparatus of an automatic transmission comprising:
an engagement part which is engaged by increasing a capacity of the engagement part and is disengaged by reducing the capacity of the engagement part;
a power-ON/OFF state judgment section which judges power-ON/OFF states; and
a control section which controls the capacity of the engagement part so as to calculate and achieve a target input revolution speed of the engagement part at least according to the power-ON/OFF states, and
the control section being configured
(a) to compare an actual input revolution speed difference absolute value that is defined as an absolute value of a difference between an input revolution speed of the engagement part when engaged and an actual input revolution speed of the engagement part with a target input revolution speed difference absolute value that is defined as an absolute value of a difference between the input revolution speed of the engagement part when engaged and the target input revolution speed of the engagement part; and
(b) to increase the capacity of the engagement part when the actual input revolution speed difference absolute value is greater than the target input revolution speed difference absolute value;
(c) to reduce the capacity of the engagement part when the actual input revolution speed difference absolute value is less than the target input revolution speed difference absolute value; and
(d) to maintain a previous capacity of the engagement part which is set before the comparison of the both actual input and target input revolution speed difference absolute values when the actual input revolution speed difference absolute value is equal to the target input revolution speed difference absolute value.

2. The control apparatus of the automatic transmission as claimed in claim 1, wherein:
the engagement part is a lock-up clutch.

3. The control apparatus of the automatic transmission as claimed in claim 1, wherein:
the engagement part is each of a plurality of engagement parts in a geared transmission mechanism that achieves a target shift position by selecting engagement/disengagement of the engagement parts.

4. The control apparatus of the automatic transmission as claimed in claim 3, further comprising:
a continuously variable transmission mechanism that is controlled so as to achieve a target transmission ratio by a cooperative shift control with the geared transmission mechanism.

5. A control apparatus of an automatic transmission comprising:
an engagement part which is engaged by increasing a capacity of the engagement part and is disengaged by reducing the capacity of the engagement part;
judging means for judging power-ON/OFF states; and
controlling means for controlling the capacity of the engagement part so as to calculate and achieve a target input revolution speed of the engagement part at least according to the power-ON/OFF states, and
the controlling means being configured
(a) to compare an actual input revolution speed difference absolute value that is defined as an absolute value of a difference between an input revolution speed of the engagement part when engaged and an actual input revolution speed of the engagement part with a target input revolution speed difference absolute value that is defined as an absolute value of a difference between the input revolution speed of the engagement part when engaged and the target input revolution speed of the engagement part; and
(b) to increase the capacity of the engagement part when the actual input revolution speed difference absolute value is greater than the target input revolution speed difference absolute value;
(c) to reduce the capacity of the engagement part when the actual input revolution speed difference absolute value is less than the target input revolution speed difference absolute value; and
(d) to maintain a previous capacity of the engagement part that is set before the comparison of the both actual input and target input revolution speed difference absolute values when the actual input revolution speed difference absolute value is equal to the target input revolution speed difference absolute value.

6. A method for controlling an automatic transmission mechanism having an engagement part which is engaged by increasing a capacity of the engagement part and is disengaged by reducing the capacity of the engagement part, the method comprising:
judging power-ON/OFF states;
controlling the capacity of the engagement part so as to calculate and achieve a target input revolution speed of the engagement part at least according to the power-ON/OFF states;
comparing an actual input revolution speed difference absolute value that is defined as an absolute value of a difference between an input revolution speed of the engagement part when engaged and an actual input revolution speed of the engagement part with a target input revolution speed difference absolute value that is defined as an absolute value of a difference between the input revolution speed of the engagement part when engaged and the target input revolution speed of the engagement part;
increasing the capacity of the engagement part when the actual input revolution speed difference absolute value is greater than the target input revolution speed difference absolute value;
reducing the capacity of the engagement part when the actual input revolution speed difference absolute value is less than the target input revolution speed difference absolute value; and
maintaining a previous capacity of the engagement part that is set before the comparison of the both actual input and target input revolution speed difference absolute values when the actual input revolution speed difference absolute value is equal to the target input revolution speed difference absolute value.

* * * * *